United States Patent Office 2,941,852
Patented June 21, 1960

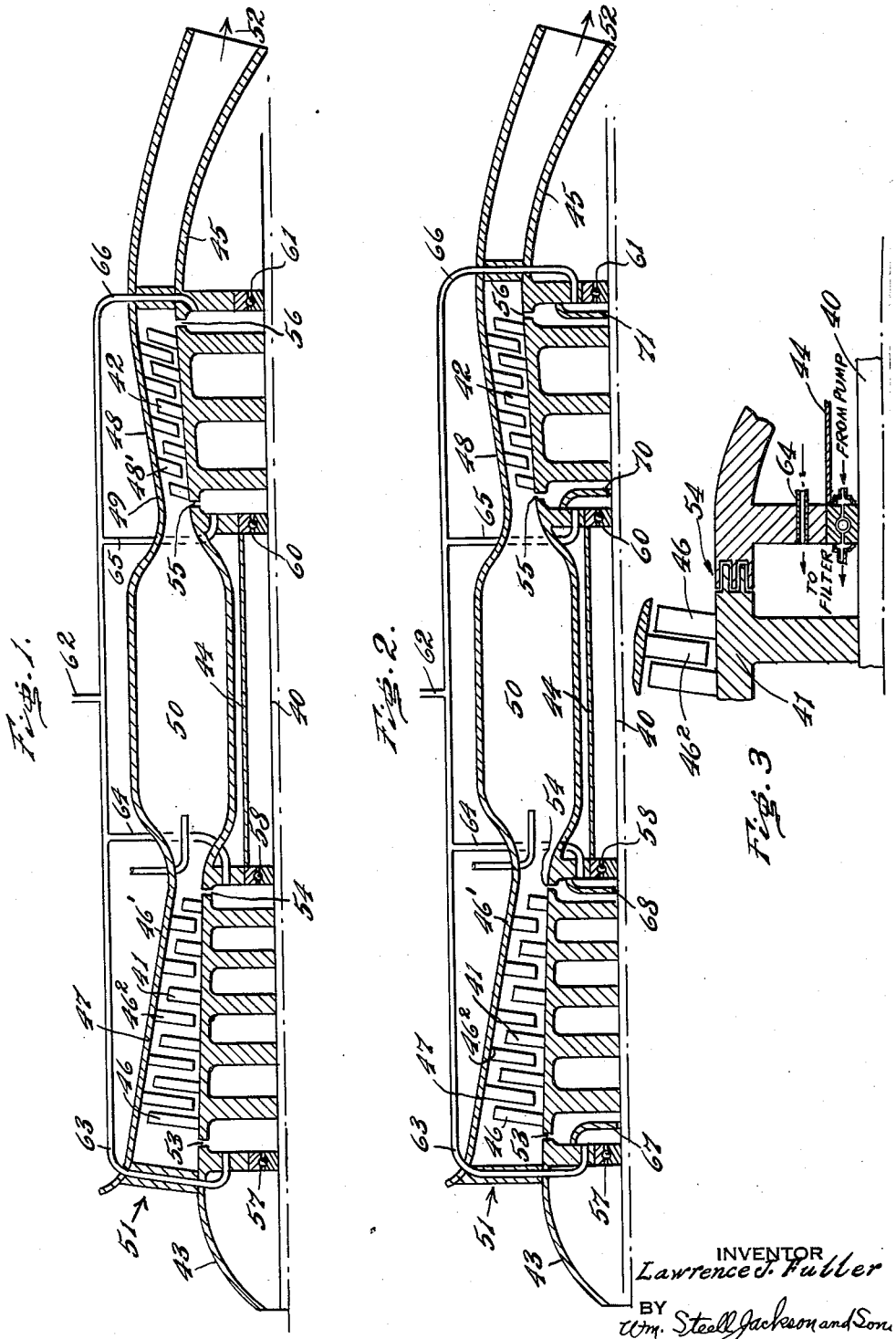

2,941,852

APPARATUS FOR PROTECTING BEARINGS AND LUBRICATION SYSTEM

Lawrence J. Fuller, Box 124, R.D. 1, Norristown, Pa.

Original application Mar. 4, 1955, Ser. No. 492,280. Divided and this application May 28, 1956, Ser. No. 587,740

5 Claims. (Cl. 308—187.1)

The present invention relates to apparatus for protecting the main bearings and the lubrication systems of turbo jet, turbo prop, gas turbine and like engines.

Engines of this type are often described as rotary engines and have as their principal moving parts air compressor rotors and turbine rotors, each of which is mounted on a shaft that runs between them. In some gas turbines a second shaft is provided connected only to the later stages of the turbine for control of power output.

The bearings on which these shafts rotate are the main engine bearings and are vital to the functioning of the engine. It is important to protect these bearings against dirt carried into the engine air compressor by the large volume of air used in the operation of the engine, in view of the fact that the method of sealing the bearings and the bearing lubrication system is adequate only for normal conditions and is not satisfactory under abnormal conditions in which a high percentage of fine solids are present in the entering air.

It will be evident that abnormal conditions, in which a high percentage of air-borne solids are present in the operating gas stream, will exist during cleaning without disassembling in accordance with my copending U.S. patent application, Serial No. 492,280, filed March 4, 1955, for Method and Apparatus for Cleaning Gas and Jet Turbine Engines, now abandoned, of which the present application is a division. It will also be evident that in operating the engine in very dusty conditions, such as flying through a dust storm, a large amount of air-borne solids in the operating gas will be encountered.

The present invention has for its principal purpose the provision of positive protection for the main bearings and the lubricating system thereof against contamination by solid particles carried in the operating gas.

A further purpose of the invention is to create a relatively superpressure of clean gas in the vicinity of the bearings and discharge clean gas through the seals into the operating gas stream, so as to prevent the possibility of flow of operating gas into the vicinity of the bearings and the lubrication system.

A further purpose is to carry the clean gas flow over the shaft and then to permit the clean gas to flow outward to the seals.

Further purposes appear in the specification and in the claims.

The accompanying drawings illustrate two embodiments of rotary engines which illustrate the principles of the invention, the forms shown being chosen largely from the standpoints of convenience in operation and satisfactory illustration of the principles involved.

Figure 1 is a diagrammatic central longitudinal half section illustrating a gas turbine to which the invention has been applied.

Figure 2 is a view similar to Figure 1 illustrating a modification.

Fig. 3 is an enlarged view of the labyrinth seal and also illustrates the forced lubrication of the bearings.

Describing in illustration but not in limitation and referring to the drawings:

The rotating parts of gas turbine or other rotating engines as shown comprise an air compressor rotor 41 and a turbine rotor 42 each suitably rotating on a shaft shown at 40. These rotating parts are flanked by a stationary housing of the engine, comprising inner housing elements 43, 44 and 45. The air compressor rotor has blades 46 which cooperate in the air compressor 46' with blades $46^2$ from the outer housing 47. Likewise the turbine rotor 42 carries blades which in the turbine 48 cooperate with blades 48' from the outer housing 49. A combustion chamber is shown at 50. Inlet air is provided at 51 and exhaust takes place at 52.

Between the inner housing portions and the rotors are labyrinth seals 53, 54, 55 and 56 which in common practice have no contacting surfaces and are not absolutely gas tight, so that gas can flow through such seals. Main bearings are provided at 57, 58, 60 and 61 between the shaft 40 and the inner housing portions. The main bearings are surrounded with oil circulated by any suitable lubrication system operating through the inner housing.

In order to prevent contamination of the main bearings and the lubrication system by solid particles passing through the labyrinth seals, I introduce clean gas, such as air, by pipes 63, 64, 65 and 66, from a source 62 which may be an external source of compressed air or may be a bleed line carrying air after passing from the air compressor through a filter or separator, and distribute the clean air to positions within the inner housing adjacent to the labyrinth seals and in communication therewith. It will be evident in Figure 1 that these pipes are located conveniently between the bearings and the labyrinth seals and are capable of building up a pressure of clean gas in the inner housing space in excess of the operating gas pressure so as to maintain a suitably small though continuous outward gas flow through the seals into the operating gas, thus preventing entrance of particles through the seals.

It will be evident that to maintain a suitable gas pressure in the internal section of the engine which houses the main bearings, it is necessary to introduce the gas at sufficient volume and pressure to cause outward flow as above described.

While the form of Figure 1 illustrates a practical embodiment of the invention, it will be evident that in very large engines the diameter of the seals may be of the order of several feet and, therefore, the quantity of clean gas required in the embodiment of Figure 1 will necessarily be quite large.

In the form of Figure 2, shields 67, 68, 70 and 71 are provided which extend annularly from a position outside the inlet ends of the gas pipes to a position adjacent the outside of the shaft, extending over the rotor side of the bearing which is exposed. The shields will preferably fit close to the rotating shaft. In view of the fact that the diameter at which the shields adjoin the shaft is very small compared to the diameter of the labyrinth seals themselves, it will be evident that a relatively smaller continuous flow of clean gas will be adequate in the form of Figure 2 to protect against contamination of the bearings and the lubrication system. In the form shown, it will be evident that no lubricant need be present outside the shields.

The main bearings receive additional protection from the lubricating system which forces lubricant through the bearings from the unexposed side to the exposed side of the bearing, where it is drained or pumped to a suitable cooler and filter as well known before being recirculated through the bearings.

The present invention serves to protect against contamination of the filter with particles which might collect in the filter and make it inoperative, and serves to prevent contamination of the lubricant itself, at the same time protecting against damage to the bearings.

By providing positive outward air flow through the labyrinth seals, it will be evident that the lubricant remains clean, the size of the filters can be reduced and filter cartridges will need less frequent replacement.

It will be evident that while the invention has been shown applied to the entire bearing system of the rotary engine, the principles of the invention may be applied to any part of the system, such as the air compressor, the turbine, or to any part or stage of the turbine as desired.

While it is preferred in many cases to use air for protection, it will be evident that any other suitably harmless gas can be employed, such as nitrogen, carbon dioxide, or one of the inert gases such as neon, argon or helium.

It will further be evident that while the invention is illustrated applied to the geometry of a conventional design or gas turbine, the principles of the invention can be modified to meet the requirements of other arrangements of rotary engine elements as required.

In view of my invention and disclosure, variations and modifications to obtain all or part of the benefits of my invention without copying the structure shown will doubtless become evident to others skilled in the art to meet individual whim or particular need, and I, therefore claim all such insofar as they fall within the reasonable spirit and scope of my claims.

Having thus described my invention what I claim as new and desire to secure by Letters Patent is:

1. A gas turbine type of engine having a supporting housing, a rotatable shaft having rotor means mounted thereon forming a high pressure gas passage with said housing, bearings having antifriction elements supporting said shaft and rotor means in said housing, a labyrinth seal between said rotor and said supporting housing to seal said gas passage from said housing and to permit relative rotation of said housing and said rotor means, a chamber between said seal and said supporting bearing, gas supplying conduit means connected directly to said chamber and outside said seal, and means for supplying clean gas to said conduit means for providing a gas creating a pressure within said chamber to maintain a first gas flow from said chamber entering the labyrinth seal on the side adjacent to said chamber and said bearing and passing through said seal to counteract the flow of gas from said high pressure passage, and a separate second gas flow from said chamber through said supporting bearing thereby maintaining the bearing free from abrasive contaminants from said high pressure passage.

2. A gas turbine type of engine having a supporting housing, a rotatable shaft having rotor means mounted thereon forming a high pressure gas passage with said housing, bearings having antifriction elements supporting said shaft and rotor means in said housing, a labyrinth seal between said rotor means and said supporting housing to seal said gas passage and to permit relative rotation of said housing and said rotor, a chamber between said seal and said supporting bearing, gas supplying conduit means connected directly to said chamber and outside said seal, a shield extending from between said seal and said conduit means to said shaft and spaced from said shaft to form a passage therebetween, means for supplying clean gas to said conduit for providing a first gas flow between said shield and past said bearing and thence through said passage to said seal and creating a pressure within said chamber to maintain a second gas flow from said chamber through the labyrinth seal on the side adjacent to said chamber and said bearing and passing through said seal to counteract the flow of gas from said high pressure passage, and a separate third gas flow from said chamber through said supporting bearing thereby maintaining the bearing free from abrasive contaminants from said high pressure passage.

3. A gas turbine as set forth in claim 1 wherein said labyrinth seal is positioned at the opposite end of said chamber from said bearing, and said conduit means is positioned between said seal and said bearing.

4. A gas turbine as set forth in claim 3 wherein a shield extends from between said seal and said conduit means, and past said conduit means to said shaft to guide the gas flow past said bearing before passing through said labyrinth seal.

5. A gas turbine as set forth in claim 1 wherein said labyrinth seal and said bearing form the sole means for the passage of gas from said chamber.

References Cited in the file of this patent

UNITED STATES PATENTS

| 2,439,447 | Buck et al. | Apr. 13, 1948 |
| 2,682,991 | Craig et al. | July 6, 1954 |